US00RE51114E

(19) United States
(12) Reissued Patent
Strömberg et al.

(10) Patent Number: US RE51,114 E
(45) Date of Reissued Patent: Nov. 10, 2026

(54) METHOD FOR REMOTELY UNLOCKING A LOCK

(71) Applicant: ASSA ABLOY AB, Stockholm (SE)

(72) Inventors: Stefan Strömberg, Stockholm (SE); Sona Singh, Täby (SE)

(73) Assignee: ASSA ABLOY AB, Stockholm (SE)

(21) Appl. No.: 18/598,359

(22) Filed: Mar. 7, 2024

Related U.S. Patent Documents

Reissue of:
(64) Patent No.: 11,270,536
Issued: Mar. 8, 2022
Appl. No.: 17/057,794
PCT Filed: Jun. 18, 2019
PCT No.: PCT/EP2019/065996
§ 371 (c)(1),
(2) Date: Nov. 23, 2020
PCT Pub. No.: WO2019/243316
PCT Pub. Date: Dec. 26, 2019

(30) Foreign Application Priority Data

Jun. 21, 2018 (SE) ..... 1850769-9

(51) Int. Cl.
*G07C 9/00* (2020.01)
*E05B 47/00* (2006.01)

(52) U.S. Cl.
CPC ..... *G07C 9/00309* (2013.01); *E05B 47/0001* (2013.01); *G07C 2009/00785* (2013.01); *G07C 9/00904* (2013.01)

(58) Field of Classification Search
CPC ..... G07C 9/00309; G07C 9/00904; G07C 2209/63; G07C 2009/00785; G07C 2009/00801; E05B 47/0001
See application file for complete search history.

(56) References Cited

U.S. PATENT DOCUMENTS 4,573,046 A * 2/1986 Pinnow ..... G07C 9/00817 340/5.64
5,999,095 A * 12/1999 Earl ..... G07C 1/32 235/382

(Continued)

FOREIGN PATENT DOCUMENTS

AU 2015203868 8/2015
CN 107545619 1/2018

(Continued)

OTHER PUBLICATIONS

International Search Report for International (PCT) Patent Application No. PCT/EP2019/065996, dated Aug. 30, 2019, 4 pages.

(Continued)

*Primary Examiner* — Ovidio Escalante
(74) *Attorney, Agent, or Firm* — Schwegman Lundberg & Woessner, P.A.

(57) ABSTRACT

It is provided a method for requesting remote unlocking of an electronic lock controlling access to a physical space. The method is performed in a user device and comprises steps of: sending a control message to an access controller, the control message comprising user authentication information, the control message causing the access controller to trigger the electronic lock to emit an alert signal; and sending an unlock message to the access controller comprising the user authentication information, in order to unlock the electronic lock.

17 Claims, 2 Drawing Sheets

(56) References Cited

U.S. PATENT DOCUMENTS 9,120,452 B2 * 9/2015 Nishimoto ..... B60R 25/24
9,330,514 B2 * 5/2016 Kuenzi ..... G07C 9/00817
9,531,721 B2 * 12/2016 Neafsey ..... H04L 63/0428
9,554,240 B2 * 1/2017 Dragomir ..... H04W 12/50
9,565,514 B2 * 2/2017 Agarwal ..... H04W 52/0258
9,641,964 B2 * 5/2017 Kulkarni ..... H04W 4/025
9,706,357 B2 * 7/2017 Heo ..... G01C 21/3688
9,986,594 B2 * 5/2018 Goel ..... H04W 4/80
10,021,511 B2 * 7/2018 Jeon ..... H04W 4/40
10,028,324 B2 * 7/2018 Kwon ..... H04W 84/18
10,114,938 B2 * 10/2018 Marchiori ..... G06F 21/35
10,172,169 B2 * 1/2019 Lee ..... H04W 4/80
10,181,871 B2 * 1/2019 Chen ..... H04W 4/33
10,321,293 B2 * 6/2019 Jackson ..... H04W 76/14
10,922,629 B2 * 2/2021 Browne ..... G07C 9/20
2005/0068178 A1 * 3/2005 Lee ..... G07F 17/12 340/569
2005/0285717 A1 12/2005 Ieda et al.
2007/0176739 A1 * 8/2007 Raheman ..... G07C 9/00904 713/176
2008/0247345 A1 * 10/2008 Bahar ..... H04W 12/08 370/310
2010/0223170 A1 9/2010 Bahar
2012/0075062 A1 * 3/2012 Osman ..... H04L 63/0853 340/5.61
2012/0157079 A1 6/2012 Metivier
2012/0221473 A1 * 8/2012 Redmann ..... G06Q 20/38215 705/50
2014/0028438 A1 * 1/2014 Kuenzi ..... G07C 9/00904 340/5.24
2014/0085087 A1 * 3/2014 Alnadwi ..... G07C 9/00309 340/542
2014/0094123 A1 * 4/2014 Polo ..... H04W 52/0216 455/41.2
2014/0095663 A1 * 4/2014 Matsumoto ..... H04W 4/025 709/217
2014/0375422 A1 * 12/2014 Huber ..... G07C 9/00571 340/5.61
2015/0076989 A1 * 3/2015 Walma ..... H05B 47/1965 315/149
2015/0161834 A1 * 6/2015 Spahl ..... G07C 9/00309 340/5.61
2015/0221152 A1 * 8/2015 Andersen ..... G07C 9/27 340/5.22
2015/0371187 A1 12/2015 Irwin et al.
2015/0379796 A1 12/2015 Glasgow et al.
2016/0066137 A1 * 3/2016 Kulkarni ..... G01S 5/0221 455/456.1
2016/0335595 A1 * 11/2016 Levy ..... G07C 9/00912
2016/0350988 A1 * 12/2016 Malhotra ..... G07C 9/00571
2017/0018130 A1 * 1/2017 Robinson ..... G07C 9/28
2017/0092030 A1 * 3/2017 Badger, II ..... G07C 9/00571
2017/0103647 A1 * 4/2017 Davis ..... G07C 9/28
2017/0248680 A1 8/2017 Kankkunen
2017/0337755 A1 * 11/2017 Biehl ..... H04W 12/108
2018/0114385 A1 * 4/2018 Gullicksen ..... G07C 9/00182
2018/0165637 A1 * 6/2018 Romero ..... G06Q 10/0833
2018/0291650 A1 * 10/2018 Zabala Zabaleta ..... E05B 47/0012
2018/0321661 A1 * 11/2018 Main-Reade ..... G05B 19/4185
2019/0114859 A1 * 4/2019 Fee ..... G07C 9/00896
2019/0385394 A1 * 12/2019 Kuenzi ..... G07C 9/00309
2019/0387473 A1 * 12/2019 Lang ..... G07C 9/00309
2020/0051352 A1 * 2/2020 Rydkin ..... G07C 9/26
2020/0120509 A1 * 4/2020 Stitt ..... H04B 17/318
2020/0349796 A1 * 11/2020 Gokcebay ..... G07C 9/00912

FOREIGN PATENT DOCUMENTS

EP 2919202 9/2015
EP 3300033 3/2018
JP 2008144531 A * 6/2008
WO WO 2012/034171 3/2012
WO WO 2018/171939 9/2018

OTHER PUBLICATIONS

Second Written Opinion for International (PCT) Patent Application No. PCT/EP2019/065996, dated May 7, 2020, 7 pages.
International Preliminary Report on Patentability for International (PCT) Patent Application No. PCT/EP2019/065996, dated Oct. 1, 2020, 16 pages.
Official Action for Sweden Patent Application No. 1850769-9, dated Feb. 18, 2019, 9 pages.

* cited by examiner

METHOD FOR REMOTELY UNLOCKING A LOCK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a national stage application under 35 U.S.C. 371 and claims the benefit of PCT Application No. PCT/EP2019/065996 having an international filing date of Jun. 18, 2019, which designated the United States, which PCT application claimed the benefit of Swedish Patent Application No. 1850769-9 filed Jun. 21, 2018, the disclosure of each of which are incorporated herein by reference.

TECHNICAL FIELD

The invention relates to a method, user device, computer program and computer program product for requesting remote unlocking of an electronic lock.

BACKGROUND

With online shopping steadily increasing, deliveries of physical goods are also increasing. Consumers want fast and cheap delivery and the delivery companies want efficiency and safety for their deliveries.

Consumers want to save time and they do not want to wait at their homes for a delivery. Traditional solutions, e.g. to leave a key or a code which would enable an access to a consumer's home for an undefined amount of time in uncontrolled conditions, are not acceptable. Considering that the value of goods is also increasing, a delivery to an open area, e.g. garden or a corridor is not satisfactory either.

Moreover, various leasing or renting solutions utilizing peer-to-peer property rental are getting more popular. Users or companies want to allow other users to use their real estate, vehicles and other closed physical spaces for a limited amount of time, but they still have high demands for the security. Although they grant access to e.g. one of their rooms or storages, it is not acceptable if the space is unlocked while the person supposed to use it is not there or if a neighbouring space is opened instead.

Current security solutions for deliveries and rental rely on delegating an access to another user, but a delivery person or any other user authorised to unlock a lock may execute their rights from any location, which can cause problems if the delivery person unlocks a lock they are not going to use immediately or if they have no or insufficient information about the position of a lock. For example, GPS information could be insufficient if the user is not aware of the altitude information, and by mistake opens a room at the wrong floor.

Another available solution relies on a physical space owner to unlock their lock exactly when a delivery person comes to their physical space, which is not acceptable, because the owner always has to be available even if they are able to open their lock remotely.

SUMMARY

It is an objective to improve security and both consumer and deliverer convenience.

According to a first aspect, it is provided a method for requesting remote unlocking of an electronic lock controlling access to a physical space. The method is performed in a user device and comprises steps of: sending a control message to an access controller, the control message comprising user authentication information, the control message causing the access controller to trigger the electronic lock to emit an alert signal; and sending an unlock message to the access controller comprising the user authentication information, in order to unlock the electronic lock.

The alert signal may be transmitted from the lock. The alert signal may be a sound signal. The alert signal may be a light signal.

The method may further comprise the step of: acquiring a lock identifier from the vicinity of the electronic lock. In such a case, the unlock message further comprises the lock identifier.

The lock identifier may be broadcast from the electronic lock.

The lock identifier may be broadcast using a Bluetooth beacon.

The lock identifier may be acquired from an optical, machine readable code.

The lock identifier may be acquired from a two dimensional bar code.

The lock identifier may be a digital image.

According to a second aspect, it is provided a user device for requesting remote unlocking of a physical space controlled by an electronic lock. The user device comprises: a processor; and a memory storing instructions that, when executed by the processor cause the user device to: send a control message to the access controller, the control message comprising user authentication information, the control message causing the access controller to trigger the electronic lock to emit an alert signal; and send an unlock message to the access controller comprising the user authentication information, in order to unlock the electronic lock.

According to a third aspect, it is provided a computer program for requesting remote unlocking of a physical space controlled by an electronic lock. The computer program comprises computer program code which, when run on an user device, causes the user device to: send a control message to the access controller, the control message comprising user authentication information, the control message causing the access controller to trigger the electronic lock to emit an alert signal; and send an unlock message to the access controller comprising the user authentication information, in order to unlock the electronic lock.

According to a fourth aspect, it is provided a computer program product comprising a computer according to [claim] the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
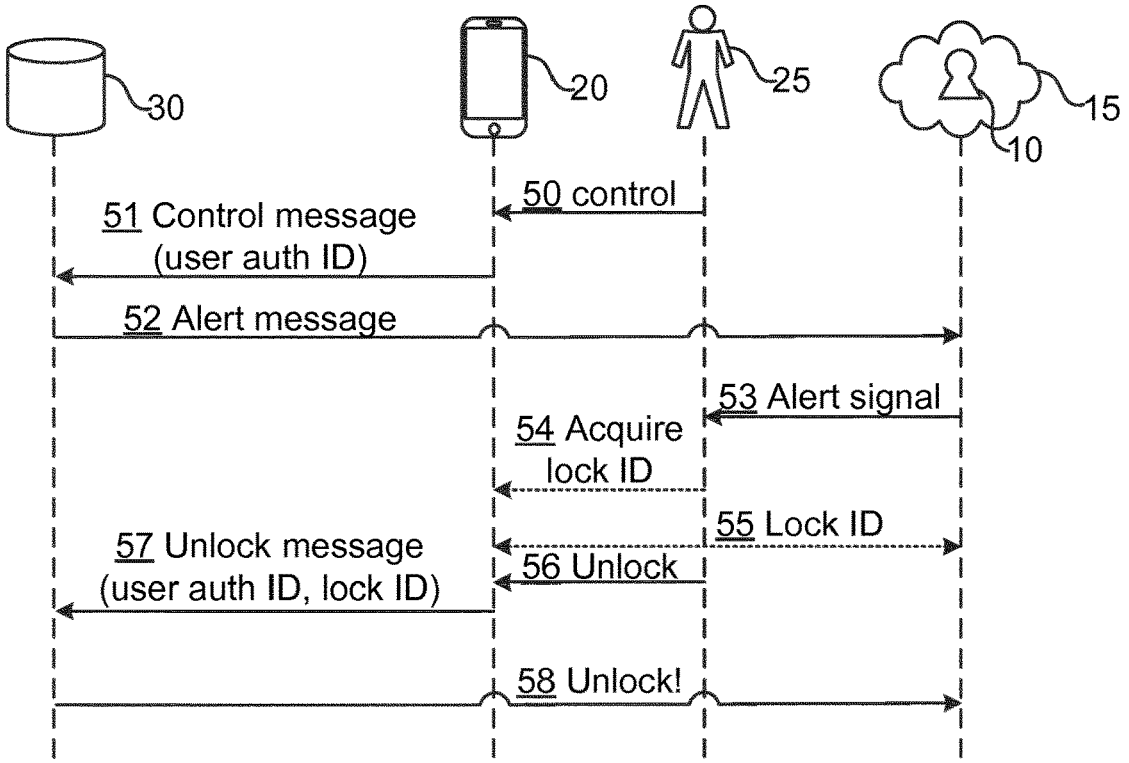
FIG. 1 is a sequence diagram illustrating a use case illustrating embodiments presented herein.

FIG. 1 is a sequence diagram illustrating a use case illustrating embodiments presented herein. A user device 20 belongs to a user 25, who e.g. can be a delivery company employee. The user device 20 is any suitable device with capability of processing and communication. For instance, the user device 20 can be implemented as a wearable device, a mobile phone, a smart phone or a tablet/laptop computer with wireless connectivity.

When the user arrives at a space to which the user is to access, the user needs to identify the correct electronic lock 10 (hereinafter also referred to simply as 'the lock').

The user controls 50 the user device 20 to transmit a control message 51 to access controller 30 to trigger an alert by the appropriate lock 10. The control message 50 comprises user authentication information. The user authentication information allows the access controller 30 to authorise the user device 20, as known in the art per se. The control message 51 causes the access controller 30 to send an alert message 52 to the electronic lock 10.

The user authorisation information is a piece of data used by the user device 20 to gain access to the closed physical space. Physical space can be a house, an apartment, a room, a vehicle, a storage or any other closed physical space.

The user authorisation information is specific *to* the particular user device and cannot be used by any other user device to gain access. It may optionally comprise information about a validity time window, defining when the user device is permitted to unlock the electronic lock 10. The user device 20 can be preconfigured to store the user authorisation information or the user device 20 can be authorised by a home owner directly or via the access controller 30.

It is to be noted that the functionality described herein being performed by the access controller 30 can form part of a server, gateway or data access layer. A gateway is a network node equipped for interfacing with another network that uses different communication protocols, e.g. to provide network (e.g. Internet) access for the electronic lock and optionally other devices in the premises of the electronic lock 10.

In order to use the access delegation to access the physical space, the deliverer (i.e. user 25) should be in the vicinity 15 of the electronic lock.

Once the lock 10 receives the alert message 52, the lock 10 emits an alert signal 53 which the user 25 can experience. For instance, the alert signal 53 can be presented to the user 25 as a short sound or light signal from the lock 10 or an external device in the vicinity 15 of the lock, connected to the lock. In one embodiment, vicinity 15 can be defined as within five metres of the lock 10. In any case, the vicinity 15 is sufficiently small so that the alert signal is distinguishable from alert signals of any other lock.

By triggering the alert signal 53, the user 25 receives a confirmation that the user is in the correct location. Since the alert signal 53 is emitted from the vicinity 15 of lock 10, it is confirmed to the user that the user is in the correct location to unlock the lock. Hence, after receiving an unlock user input 56 (e.g. in an application, also known as *an* app, executing in the user device 20) from the user 25, the user device 20 can send an unlock message 57 to the access controller 30. The unlock message 57 comprises the user authentication identification to the access controller 30. The access controller 30 then transmits a corresponding unlock command 58 to the electronic lock 10 to be unlocked.

In one embodiment, in order for the user to prove his/her presence at the appropriate location, the user device 20 acquires 54 lock identifier which is provided in the physical space 15 or its surroundings. The lock identifier is only locally provided, whereby the user needs to be close to the electronic lock to obtain the lock identifier. The lock identifier can be acquired in a signal 55 from the lock 10 or from user input 54, where the user obtains the lock identifier.

The lock identifier can be in the lock, on the lock or on a distance short enough to be able to distinguish between more than one lock on e.g. neighbouring hotel room doors or apartment doors. For instance, the lock identifier can be provided within 1 metre, or 30 cm of the lock.

The lock identifier may be broadcast to the user device 20 e.g. using a Bluetooth low energy beacon or any other short-range transmitter. The lock identifier may also be optically presented to the user device 20 as a barcode, e.g. a QR code.

In one embodiment, the lock identifier may be an image or a video of the electronic lock 10 or physical space 15 or its surroundings, acquired by the user device 20. In this embodiment, the user can use the camera of the user device 20 to capture the image or video. Using image processing, the captured image or video can be compared with stored images for that location, whereby it can be determined whether the user is at the location of the lock or not.

The user device 20 sends an unlock message 57 to the access controller 30. The unlock message comprises user authorisation information together with the acquired lock identifier. After it is verified that the user is indeed in proximity to the electronic lock 10, the access controller 30 can then send an unlock message to the electronic lock to be opened.

Figure 2:
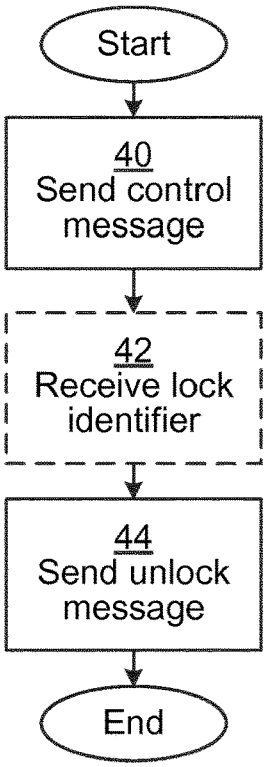
FIG. 2 is a flow chart illustrating a method for requesting remote unlocking of a physical space.

FIG. 2 is a flow chart illustrating a method for requesting remote unlocking of a physical space. The method corresponds to the actions performed by the user device in FIG. 1 and described above. The method is performed in the user device of FIG. 1.

In a send control message step 40, the user device sends a control message to an access controller. The control message comprises user authentication information. The control message causes the access controller to trigger the electronic lock to emit an alert signal. The alert signal can be transmitted from the lock. The alert signal can be a sound signal and/or a light signal, allowing the user to be alerted of the location of the electronic lock.

In an optional receive lock identifier step 42 the user device acquires a lock identifier from the vicinity of the electronic lock.

The lock identifier can be broadcast from the electronic lock. For instance, the lock identifier can be broadcast using a Bluetooth beacon. Alternatively, the lock identifier can be acquired from an optical, machine readable code provided by the electronic lock. Alternatively, the lock identifier is acquired from a two dimensional bar code. Alternatively, the lock identifier can be based on a digital image of a camera of the user device as described above.

In a send unlock message step 44, the user device sends an unlock message to the access controller comprising the user authentication information, in order to unlock the electronic lock. When step 42 is performed, the unlock message also comprises the lock identifier.

Figure 3:
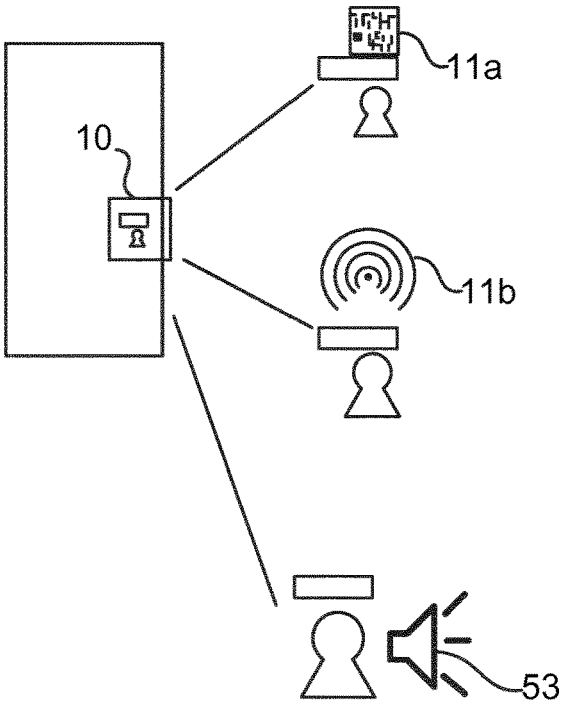
FIG. 3. illustrates various two examples of a lock identifier and an alert signal.

[FIG. 3.] *FIG. 3* illustrates various two examples of a lock identifier and an alert signal from a lock 10. On the right-hand side of FIG. 3, the uppermost example illustrates a lock identifier 11a in the form of an optical, machine readable code, in this example a QR (Quick response) code. The middle example illustrates a lock identifier [lib] *11b* in the form of a Bluetooth beacon. The lowermost example illustrates an alert signal 53 emitted by the lock, in this example in the form of an audible signal.

Figure 4:
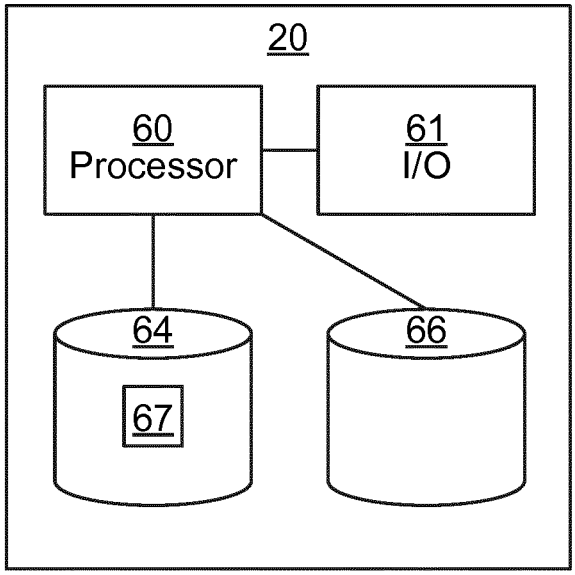
FIG. 4 is a schematic diagram illustrating components of the user device of FIG. 1.

FIG. 4 is a schematic diagram illustrating components of the user device 20 of FIG. 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 2 and FIG. 3 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The user device 20 further comprises an I/O interface 62 for communicating with external and/or internal entities.

Other components of the user device 20 are omitted in order not to obscure the concepts presented herein.

Figure 5:
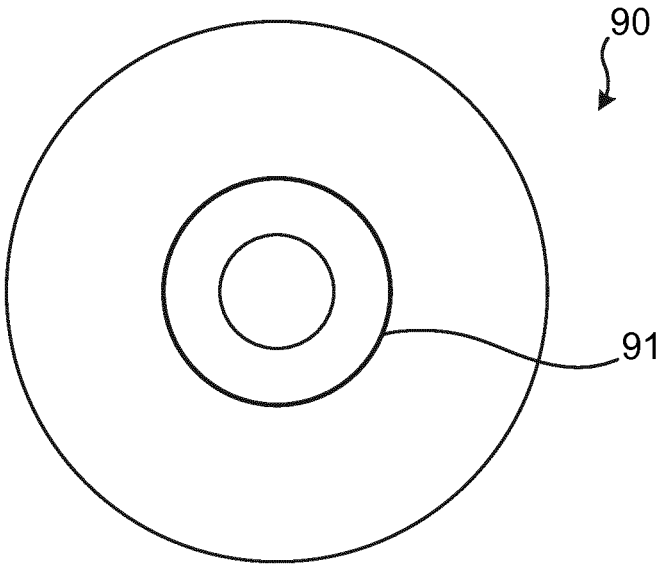
FIG. 5 shows one example of a computer program product 90 comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for requesting remote unlocking of an electronic lock controlling access to a physical space, the method being performed in a user device and comprising:

receiving user input *from a user* to transmit a control message to an access controller to trigger an alert signal by a specific electronic lock, wherein the access controller is located remotely from the specific electronic lock;

sending the control message to the access controller, the control message comprising user authentication information, the control message causing the access controller to trigger the specific electronic lock to (*i*) *at least one of broadcast or optically present a lock identifier and* (*ii*) emit the alert signal*, in order for the user to identify the specific electronic lock as a correct electronic lock*, wherein the alert signal is a light signal; [and]

*acquiring the lock identifier associated with and provided in the vicinity of the specific electronic lock; and* sending an unlock message to the access controller comprising the user authentication information *and the lock identifier* after receiving an unlock user input from the user to unlock the specific electronic lock, in order to unlock the specific electronic lock.

2. The method according to claim 1, wherein the alert signal is [transmitted] *emitted* from the *specific electronic* lock *to the user in the vicinity of the lock*.

[3. The method according to claim 1, further comprising: acquiring a lock identifier from the vicinity of the electronic lock; wherein the unlock message further comprises the lock identifier.]

4. The method according to claim [3,] *1*, wherein the lock identifier is broadcast from the *specific* electronic lock *to the user device*.

5. The method according to claim 4, wherein the lock identifier is broadcast using a Bluetooth beacon.

6. The method according to claim [3,] *1*, wherein the lock identifier is [acquired from] *optically presented from the specific electronic lock to the user device as* an optical, machine-readable code.

7. The method according to claim 6, wherein the lock identifier is [acquired from] *optically presented from the specific electronic lock to the user device as* a two-dimensional bar code.

[8. The method according to claim 3, wherein the lock identifier is a digital image.]

9. A user device for requesting remote unlocking of a physical space controlled by an electronic lock, the user device comprising:

a processor; and a memory storing instructions that, when executed by the processor cause the user device to:

receive user input *from a user* to transmit a control message to an access controller to trigger an alert signal by a specific electronic lock, wherein the access controller is located remotely from the specific electronic lock, wherein the alert signal is a light signal;

send the control message to the access controller, the control message comprising user authentication information, the control message causing the access controller to trigger the specific electronic lock to (*i*) *at least one of broadcast or optically present a lock identifier and* (*ii*) emit the alert signal, *in order for the user to identify the specific electronic lock as a correct electronic lock*; [and]

*acquire the lock identifier associated with and provided in the vicinity of the specific electronic lock; and* send an unlock message to the access controller comprising the user authentication information *and the lock identifier* after receiving an unlock user input from the user to unlock the specific electronic lock, in order to unlock the specific electronic lock.

10. A non-transitory computer-readable medium comprising a computer program stored thereon for requesting remote unlocking of a physical space controlled by an electronic lock, the computer program comprising computer program code which, when run on [an] *a* user device, causes the user device to:

receive user input *from a user* to transmit a control message to an access controller to trigger an alert signal by a specific electronic lock, wherein the access controller is located remotely from the specific electronic lock;

send the control message to the access controller, the control message comprising user authentication information, the control message causing the access controller to trigger the specific electronic lock to (*i*) *at least one of broadcast or optically a lock identifier and* (*ii*) emit the alert signal, *in order for the user to identify the specific electronic lock as a correct electronic lock*, wherein the alert signal is a light signal; [and]

*acquire the lock identifier associated with and provided in the vicinity of the specific electronic lock; and* send an unlock message to the access controller comprising the user authentication information *and the lock identifier* after receiving an unlock user input from the user to unlock the specific electronic lock, in order to unlock the specific electronic lock.

*11. A method for requesting remote unlocking of an electronic lock controlling access to a physical space, the method being performed in a user device and comprising:*

*receiving user input from a user to transmit a control message to an access controller to trigger an alert by a specific electronic lock, wherein the access controller is separate from the specific electronic lock;*

*sending the control message to the access controller, the control message comprising user authentication information, wherein the control message causes the access controller to trigger the specific electronic lock to* (*i*) *at least one of broadcast or optically present a lock identifier and* (*ii*) *emit the alert, in order for the user to identify the specific electronic lock as a correct electronic lock;*

*acquiring the lock identifier associated with and provided in the vicinity of the specific electronic lock; and*

*sending an unlock message to the access controller after receiving an unlock user input from the user to unlock the specific electronic lock, wherein the unlock message comprises the user authentication information and the lock identifier, and wherein the unlock message causes the access controller to unlock the specific electronic lock.*

*12. The method according to claim 11, wherein the alert is an alert signal emitted from the specific electronic lock to the user in the vicinity of the lock.*

*13. The method according to claim 12, wherein the alert signal is at least one of a sound signal or a light signal.*

*14. The method according to claim 11, wherein the lock identifier is broadcast from the specific electronic lock to the user device.*

*15. The method according to claim 14, wherein the lock identifier is broadcast using a Bluetooth beacon.*

*16. The method according to claim 11, wherein the lock identifier is optically presented from the specific electronic lock to the user device as an optical, machine-readable code.*

*17. The method according to claim 16, wherein the lock identifier is optically presented from the specific electronic lock to the user device as a two-dimensional bar code.*

*18. A user device for requesting remote unlocking of a physical space controlled by an electronic lock, the user device comprising:*

*a processor; and*

*a memory storing instructions that, when executed by the processor cause the user device to:*

*receive user input from a user to transmit a control message to an access controller to trigger an alert by a specific electronic lock, wherein the access controller is separate from the specific electronic lock;*

*send the control message to the access controller, the control message comprising user authentication information, wherein the control message causes the access controller to trigger the specific electronic lock to* (*i*) *at least one of broadcast or optically present a lock identifier and* (*ii*) *emit the alert, in order for the user to identify the specific electronic lock as a correct electronic lock;*

*acquire the lock identifier associated with and provided in the vicinity of the specific electronic lock; and*

*send an unlock message to the access controller after receiving an unlock user input from the user to unlock the specific electronic lock, wherein the unlock message comprises the user authentication information and the lock identifier, and wherein the unlock message causes the access controller to unlock the specific electronic lock.*

*19. A non-transitory computer-readable medium comprising a computer program stored thereon for requesting remote unlocking of a physical space controlled by an electronic lock, the computer program comprising computer program code which, when run on a user device, causes the user device to:*

*receive user input from a user to transmit a control message to an access controller to trigger an alert by a specific electronic lock, wherein the access controller is separate from the specific electronic lock;*

*send the control message to the access controller, the control message comprising user authentication information, wherein the control message causes the access controller to trigger the specific electronic lock to* (*i*) *at least one of broadcast or optically present a lock identifier and* (*ii*) *emit the alert, in order for the user to identify the specific electronic lock as a correct electronic lock;*

*acquire the lock identifier associated with and provided in the vicinity of the specific electronic lock; and*

*send an unlock message to the access controller after receiving an unlock user input from the user to unlock the specific electronic lock, wherein the unlock message comprises the user authentication information and the lock identifier, and wherein the unlock message causes the access controller to unlock the specific electronic lock.*

* * * * *